United States Patent
Oshizawa et al.

(10) Patent No.: US 6,253,154 B1
(45) Date of Patent: *Jun. 26, 2001

(54) METHOD AND APPARATUS FOR NAVIGATING WITH CORRECTION OF ANGULAR SPEED USING AZIMUTH DETECTION SENSOR

(75) Inventors: Hidekazu Oshizawa; Toshikazu Sakakibara, both of Cupertino; Noboru Taniguchi, San Jose, all of CA (US)

(73) Assignee: Visteon Technologies, LLC, Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,484

(22) Filed: Nov. 22, 1996

(51) Int. Cl.[7] ............................................... G06F 165/00
(52) U.S. Cl. .......................... 701/221; 701/220; 702/93; 702/151
(58) Field of Search ................................. 701/220, 221, 701/216, 224; 702/92, 93, 145, 151; 342/457

(56) References Cited

U.S. PATENT DOCUMENTS

| | | | |
|---|---|---|---|
| 3,845,289 | 10/1974 | French | 235/151.2 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |

(List continued on next page.)

FOREIGN PATENT DOCUMENTS

| | | |
|---|---|---|
| 0 496 517 A1 | 7/1992 | (EP) . |
| 0 555 586 A1 | 8/1993 | (EP) . |
| 0 690 289 A1 | 1/1996 | (EP) . |

OTHER PUBLICATIONS

French, *MAP matching Origins Approaches and Applications,* Robert L. French & Associates, 3815 Lisbon St., Suite 201, Fort Worth, Texas 76107, USA, pp. 91–116.

*Primary Examiner*—Michael J. Zanelli
(74) *Attorney, Agent, or Firm*—Beyer & Weaver, LLP

(57) ABSTRACT

An apparatus and method for more accurately determining the position of a moving object by using an azimuth detector distinct from an angular speed detector to correct the gain error and the offset error of the angular speed detector. The position of the moving body is determined using the offset error- and gain error-corrected angular speed. The correction of the offset error includes checking the azimuth and movement of the moving object for three predetermined periods of time; then checking whether the moving object was moving in a straight line each of the three predetermined periods of time. If the object was moving in a straight line each of the three predetermined periods of time, then an offset error correction value is computed using data from the second of the three predetermined periods of time. The correction of the gain error includes determining the movement of the moving object as straight; then determining the movement of the moving object as a turn; then determining the movement of the moving object as straight again. If the turn was a left turn, a left gain error correction value is computed. Similarly, if the turn was a right turn, a right gain error correction value is computed.

21 Claims, 14 Drawing Sheets

U.S. PATENT DOCUMENTS

| | | | |
|---|---|---|---|
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,177,685 | 1/1993 | Davis et al. | 364/443 |
| 5,283,743 | 2/1994 | Odagawa | 364/457 |
| 5,287,297 | 2/1994 | Ihara et al. | 364/571.02 |
| 5,296,855 * | 3/1994 | Matsuzaki et al. | 340/988 |
| 5,297,050 | 3/1994 | Ichimura et al. | 364/444 |
| 5,404,307 | 4/1995 | Odagawa | 364/454 |
| 5,424,953 | 6/1995 | Masumoto et al. | 364/449 |
| 5,469,158 * | 11/1995 | Morita | 340/988 |
| 5,479,079 | 12/1995 | Jeong et al. | 318/568.12 |
| 5,699,256 * | 12/1997 | Shibuya et al. | 364/453 |
| 5,742,925 * | 4/1998 | Baba | 701/221 |

\* cited by examiner

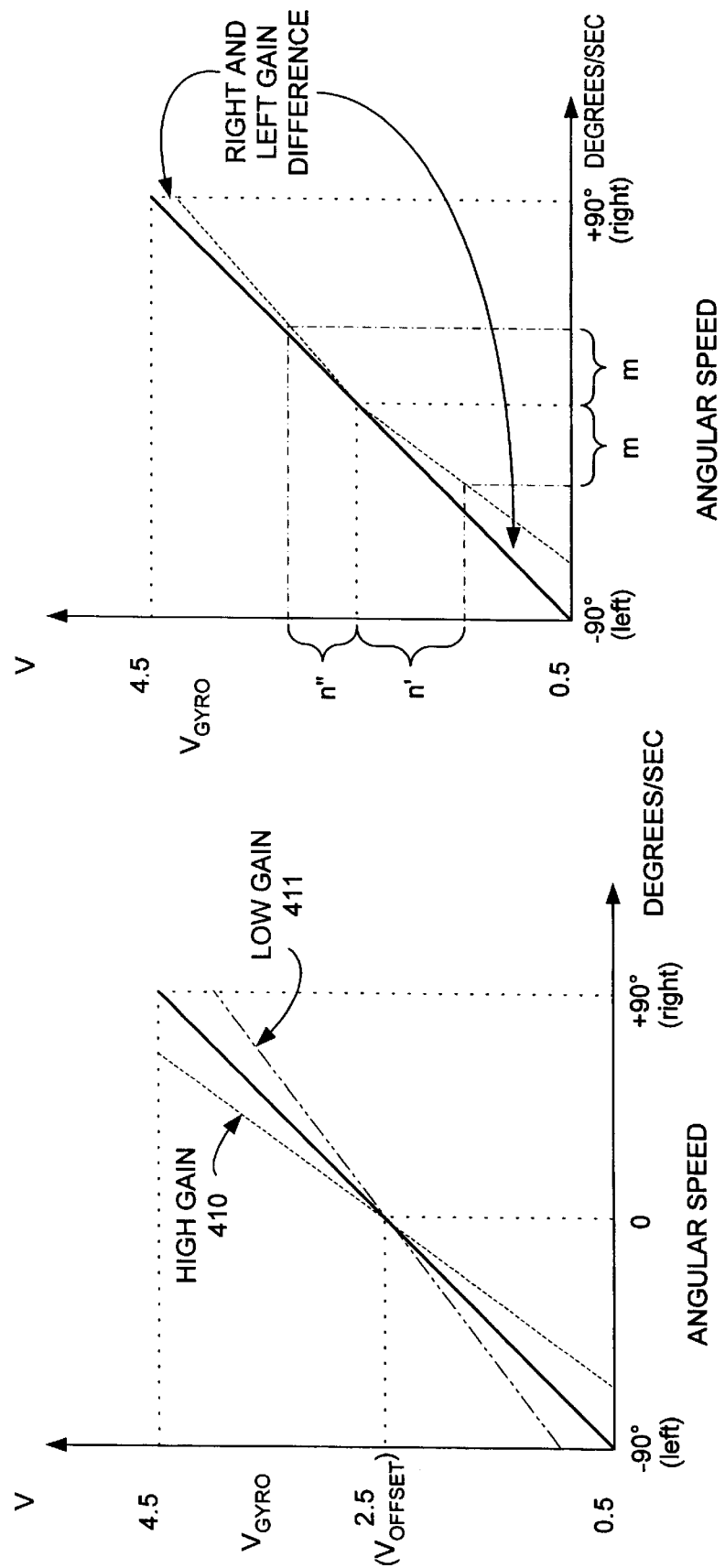

METHOD AND APPARATUS FOR NAVIGATING WITH CORRECTION OF ANGULAR SPEED USING AZIMUTH DETECTION SENSOR

BACKGROUND OF THE INVENTION

The present invention generally relates to systems for navigation. In particular, the invention relates to correcting angular speed, offset error and gain error in a system for navigation.

Systems in the art for navigating a vehicle may employ a gyroscopic sensor to detect the angular speed of the vehicle. It is well known that each such gyroscope has several characteristics whose actual values are specific to that particular gyroscope. These gyroscopic characteristics include offset error for the typifying offset; gain error for the typifying gain; and right and left gain differences for the typifying right and left gain. These gyroscopic characteristics cause the navigation apparatus to incorrectly position the vehicle. Each is described in turn below.

Each gyroscope gives a voltage output corresponding to the angular speed of the object (e.g., the vehicle) on which it is mounted. FIGS. 2A and 2B illustrate the relationship of the gyroscopic output voltage to the angular speed of the vehicle. The angular speed (AS) of the vehicle equals the output voltage of the gyroscope ($V_{GYRO}$) less the typifying offset voltage ($V_{OFFSET}$), divided by the gain (G):

$$AS = \frac{V_{GYRO} - V_{OFFSET}}{G} \quad (1)$$

However, each gyroscope has a characteristic offset error. FIG. 3 illustrates the relationship of two offset errors to the typifying offset of the gyroscope. In FIG. 3, the offset error 310 is positive, causing the high offset 320. The offset error 311 is negative, causing the low offset 321.

Accordingly, the angular speed of the vehicle is better determined not as in equation (1) but as in equations (2) and (3):

$$AS_{OFFSET\ ERROR} = \frac{V_{GYRO,OFFSET\ ERROR} - V_{OFFSET}}{G} \quad (2)$$

$$V_{GYRO,OFFSET\ ERROR} = V_{GYRO} + V_{OFFSET\ ERROR} \quad (3)$$

The angular speed with the offset error ($AS_{OFFSET\ ERROR}$) equals the voltage output of the gyroscope with the offset error ($V_{GYRO,\ OFFSET\ ERROR}$) less the offset ($V_{OFFSET}$), divided by the gain (G). The voltage output including the offset error ($V_{GYRO,\ OFFSET\ ERROR}$) is sum of the voltage output of the gyroscope ($V_{GYRO}$) and the offset error ($V_{OFFSET\ ERROR}$).

Thus, even though the vehicle may be moving in a straight line, the systems of the prior art may determine that the vehicle is turning right when the characteristic offset error is positive. Conversely, the systems of the prior art may determine that the vehicle is turning left when the characteristic offset error is negative. These wrong determinations cause systems of the prior art to position the vehicle incorrectly.

Further, each gyroscope has a characteristic gain error. FIG. 4 illustrates the relationship of two gain errors to the typifying gain of the gyroscope. A high gain error is charted as the high gain error 410. A low gain error is charted as the low gain error 411. As a result, in the presence of gain error, the angular speed of the vehicle is determined by equations (4), (5) and (6) rather than equation (1):

$$AS_{G\ ERROR} = \frac{V_{GYRO} - V_{OFFSET}}{G_{G\ ERROR}} \quad (4)$$

$$G_{G\ ERROR} = G \times K_{G\ ERROR} \quad (5)$$

$$K_{G\ ERROR} := 1,\ \text{No Error} \quad (6)$$
$$> 1,\ \text{High Gain}$$
$$< 1,\ \text{Low Gain}$$

Now the angular speed in consideration of the gain error ($AS_{G\ ERROR}$) is the difference between the output voltage of the gyroscope ($V_{GYRO}$) and the offset voltage ($V_{OFFSET}$), divided by the gain with gain error ($G_{G\ ERROR}$). The gain with gain error ($G_{G\ ERROR}$) is the typifying gain of the gyroscope (G) ratioed by a factor $K_{G\ ERROR}$. $K_{G\ ERROR}$ equals 1 when there is no gain error but is less than one when the gain is erroneously low. $K_{G\ ERROR}$ is greater than one when the gain is erroneously high.

The presence of the characteristic gain error causes apparatus of the prior art to detect and determine the position of the vehicle incorrectly. For example, where the vehicle actually turns 90°, a system with a high gain error determines that the vehicle has turned more than the actual 90°. Likewise, a system with a low gain error detects that the vehicle has turned something less than the true 90°.

As a final example consider the difference in characteristic gyroscopic gain error between right and left vehicle movements. FIG. 4 illustrates the relationship of the differential right and left gain error with respect to the typifying gain of a gyroscope. For a vehicle turning m degrees/sec to the left and then m degrees/sec to the right, a system not adjusting for the differential right and left gain error detects different absolute values ¦n'¦ and ¦n"¦ for the left and right turns, respectively.

Accordingly, there is a need for a methodology and device which detects a characteristic error in a gyroscope, including offset error, gain error and the differential right and left gain error.

Also, there is a need for a methodology and device which compensates for a characteristic error in a gyroscope, including offset error, gain error and the differential right and left gain error.

In U.S. Pat. No. 5,404,307 (April, 1995), Odagawa describes a navigation apparatus which corrects data from a angular speed detector with data from an azimuth detector. Likewise, in U.S. Pat. No. 5,424,953 (June, 1995), Masumoto et al. also describes a navigation apparatus which corrects data from an angular speed detector with data from an azimuth detector.

However, when the gyroscope has different gains for right and left turns, the Odagawa navigation system cannot effect corrections so that the gain correction value is accurate for both right and left turns.

Further, Masumoto attempts to detect the straight movement of a vehicle using the output of an angular speed sensor and a direction detection sensor. However, where the angular speed sensor has an offset error, the Masumoto device operates incorrectly.

In both the Odagawa and Masumoto devices, before the first determination of the gain error correction value after powering on of the system, compensation for that gain error is not possible.

SUMMARY OF THE INVENTION

Herein is described an apparatus and method for determining the position of an object, particularly during navigation. In one embodiment, the apparatus and method include correcting the offset error of an angular speed detector (typically, a gyroscope) using an azimuth detector distinct from the angular speed detector; and then determining the position of the moving body using the offset error-corrected angular speed.

In a second embodiment, the apparatus and method include correcting the gain error of the angular speed detector using an azimuth detector distinct from the angular speed detector; and then determining the position of the moving body using the gain error-corrected angular speed.

In a third embodiment, the apparatus and method include correcting both the gain error and the offset error of an angular speed detector using an azimuth detector distinct from the angular speed detector; and then determining the position of the moving body using the offset error- and gain error-corrected angular speed.

The correction of the offset error includes checking the azimuth and movement of the object for three predetermined periods of time; then checking whether the object was moving in a straight line each of the three predetermined periods of time. If the object was moving in a straight line each of the three predetermined periods of time, then an offset error correction value is computed using data from the second of the three predetermined periods of time.

The correction of the gain error includes determining the movement of the object as straight; then determining the movement of the object as a turn; then determining the movement of the object as straight again. If the turn was a left turn, a left gain error correction value is computed. Similarly, if the turn was a right turn, a right gain error correction value is computed.

BRIEF DESCRIPTION OF THE DRAWINGS

FIG. 4 illustrates the relationship of the gain error to the typifying gain of a gyroscope;

FIG. 15 illustrates the relationship of the differential right and left gain error with respect to the typifying gain of a gyroscope.

DESCRIPTION OF THE PREFERRED EMBODIMENT

Figure 1:
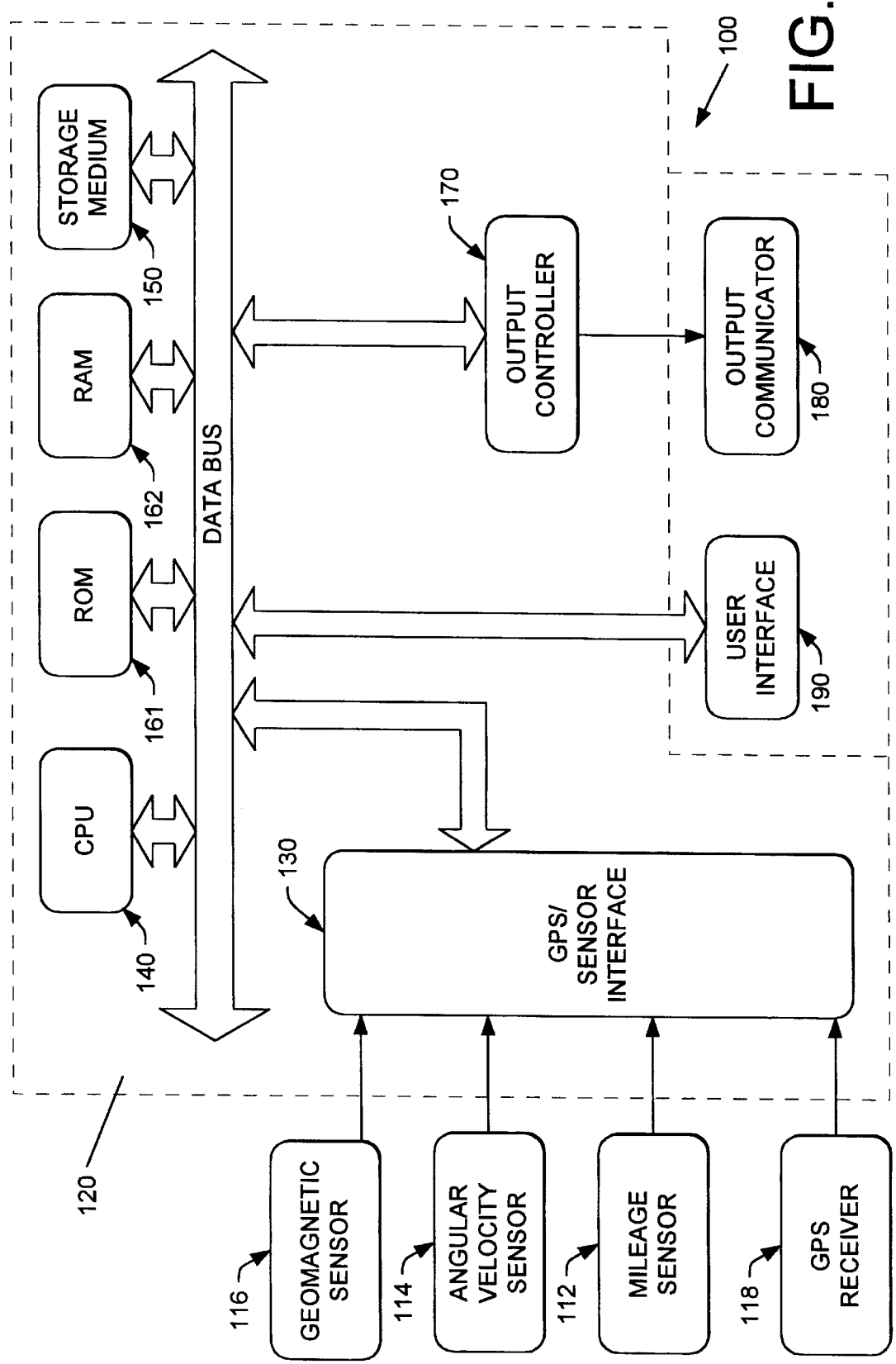
FIG. 1 is a block diagram of a vehicle navigation system for use with the present invention.
Figure 2:
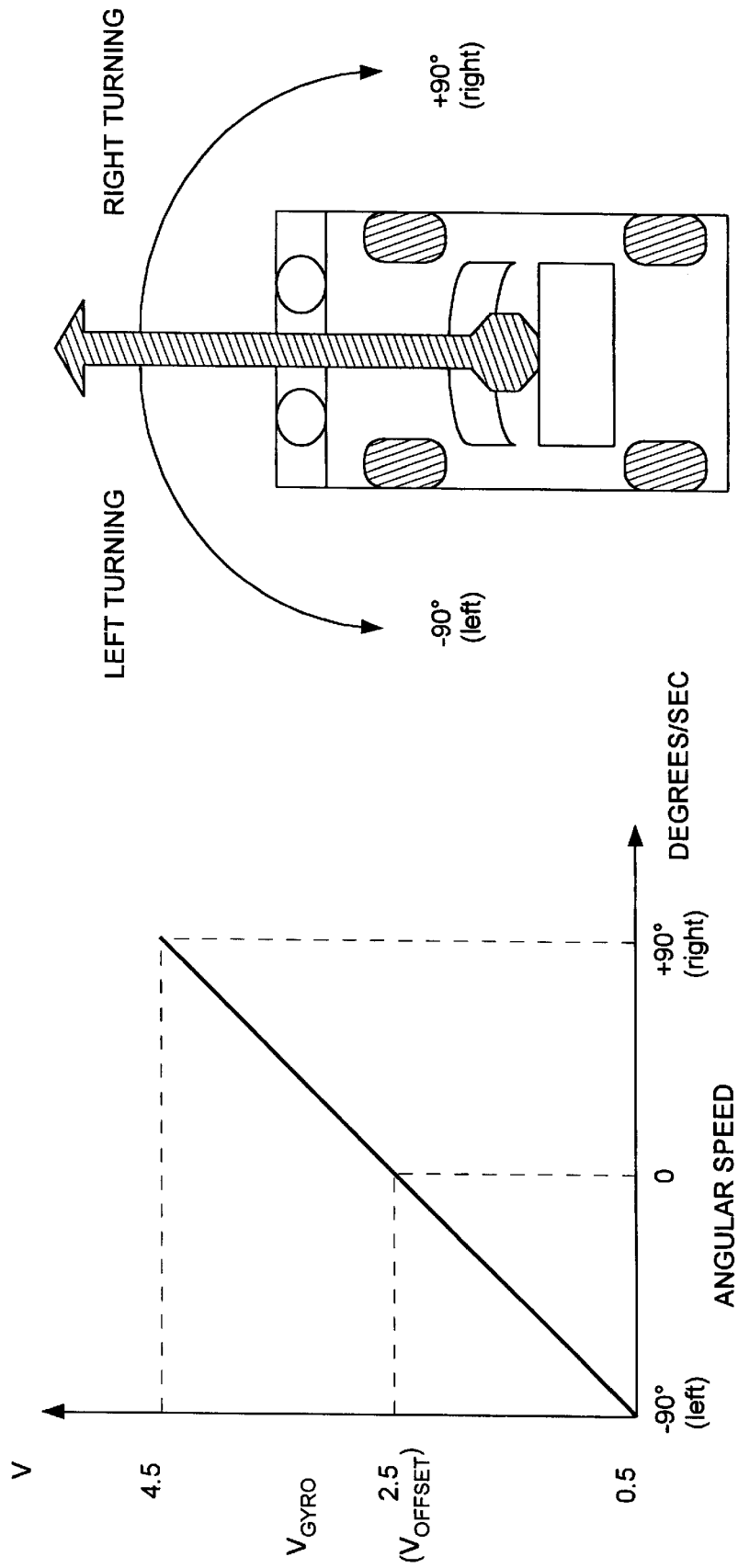
FIGS. 2A and 2B illustrate the relationship of the gyroscopic output voltage to the angular speed of a vehicle.
Figure 3:
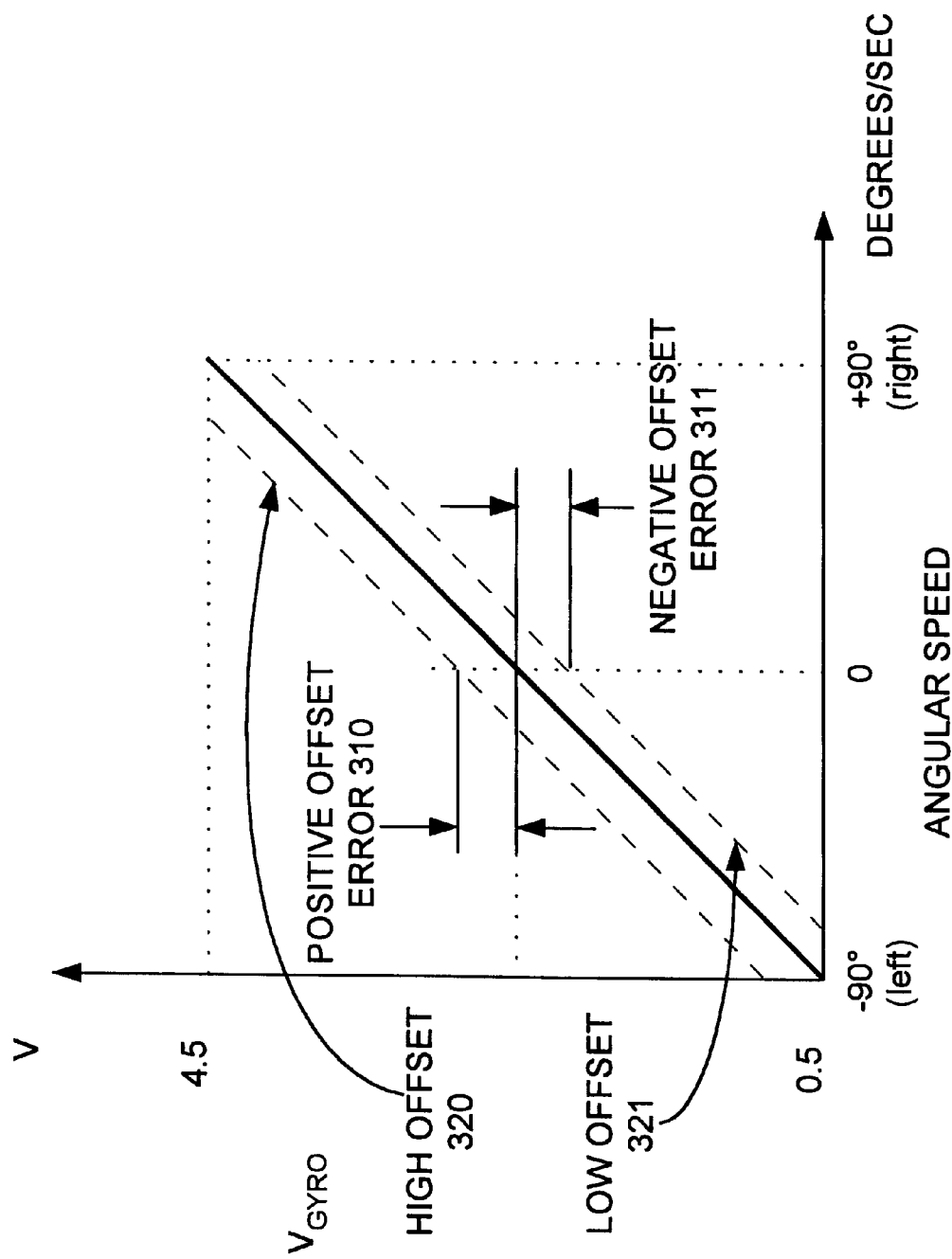
FIG. 3 illustrates the relationship of the offset error to the typifying offset of a gyroscope.

FIG. 1 is a block diagram of a vehicle navigation system 100 for use with the present invention. The sensors 112 to 116 and the GPS receiver 118 are coupled to the computing means 120 through the sensor/GPS interface 130. In typical embodiments, the mileage sensor 112 comprises an odometer; the angular velocity sensor 114 comprises a gyroscope, or a differential odometer coupled to the wheels of the vehicle; and the geomagnetic sensor 116 usually comprises a magnetic compass mounted in the vehicle. A global positioning system (GPS) data receiver 118 is provided for receiving signals from, for example, a satellite-based navigation system. Data from the sensor/GPS interface 130 is transmitted to the CPU 140 which performs calibration, signal processing, dead-reckoning, vehicle positioning and route guidance functions.

A database containing map information may be stored in the storage medium 150, with software directing the operation of the computing means 120 stored in the ROM 161 or the RAM 162 for execution by the CPU 140. The RAM 162 also permits reading and writing of the information necessary to execute such software programs. The storage medium 150 may include a hard disk drive, CD-ROM or integrated circuit onto which digitized map information has been stored or may include an interface to an external storage medium (not shown).

The output controller 170, which may include a graphics controller, receives data processed by the CPU 140 and transmits such data to the output communicator 180, which usually includes a display screen. The user may input data, such as a desired destination, through user interface 190, typically including a keyboard.

The map database stored in the storage medium 150 preferably includes positional data such as, for example, latitude and longitude coordinates to describe road intersections, road segments, landmarks, points of interest and other geographical information. The data base may further include data representing characteristics of roads or places on the map such as road and place names, road features (for example, dividers, one-way restrictions, surface, speed limit, shape and elevation), and other properties. Using the data stored in the map data base, the vehicle navigation system 100 generates one or more possible positions of the vehicle by comparing the dead-reckoned position to the road segments, intersections, and other geographical locations stored in the data base. The system then filters the set of position possibilities and selects from the remaining position possibilities a position deemed to be the current position of the vehicle.

Overview

The invention disclosed hereinbelow determines the characteristic offset error of a gyroscope and corrects for the offset error. Also, the invention determines the characteristic gain error of a gyroscope and corrects for the gain error. Still further, the invention also determines and corrects for the differential gain error for right and left turns. By incorporating the corrections to the offset error and the (right and left) gain error into the determination of the angular speed, the invention correctly determines the angular speed of the object. Each of these determinations is explained in turn below, beginning with the determination and correction of the characteristic offset error.

Determination of Offset Error Correction Value

Figure 12:
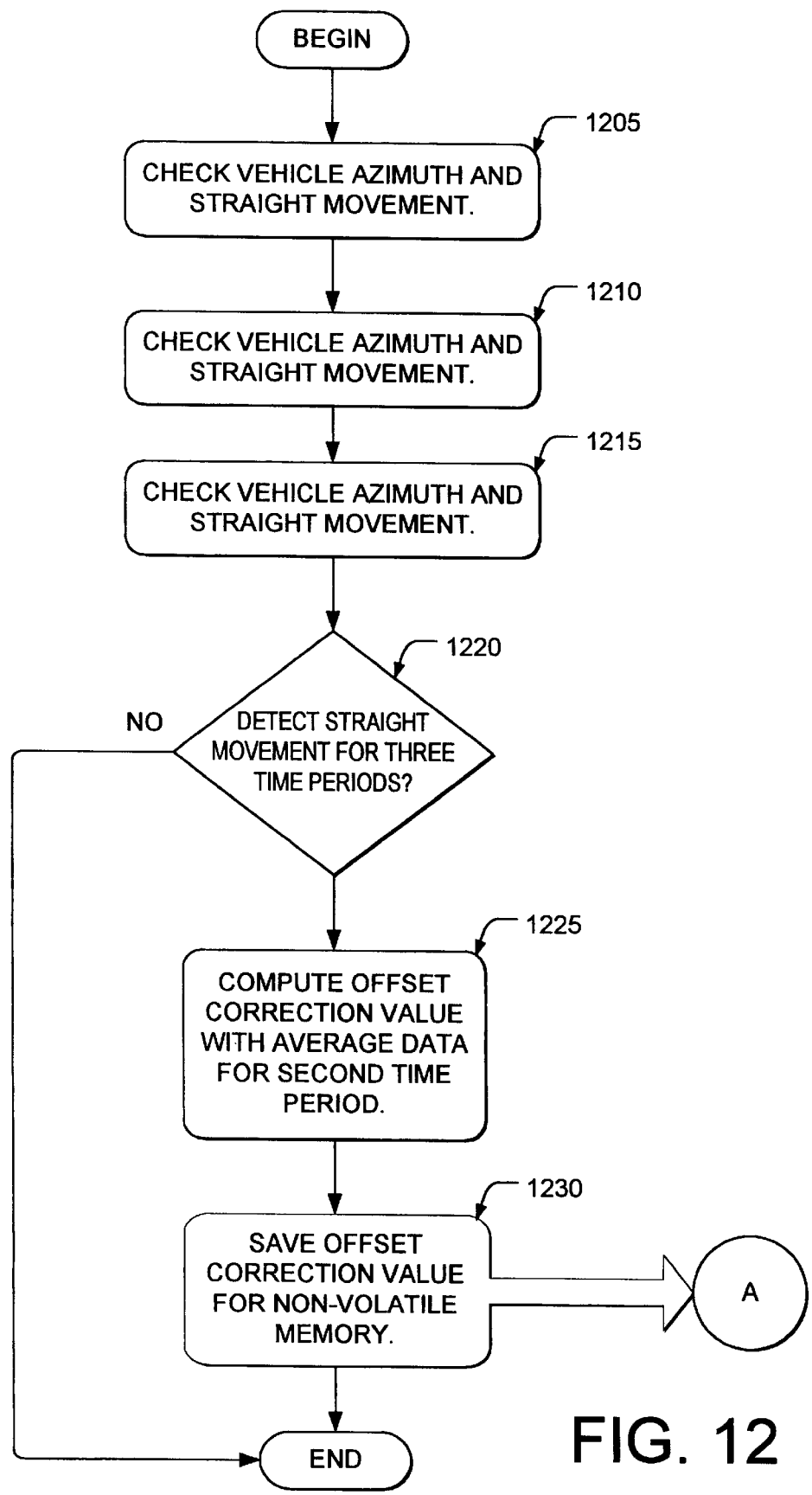
FIG. 12 illustrates the determination of the offset correction value.
Figure 13:
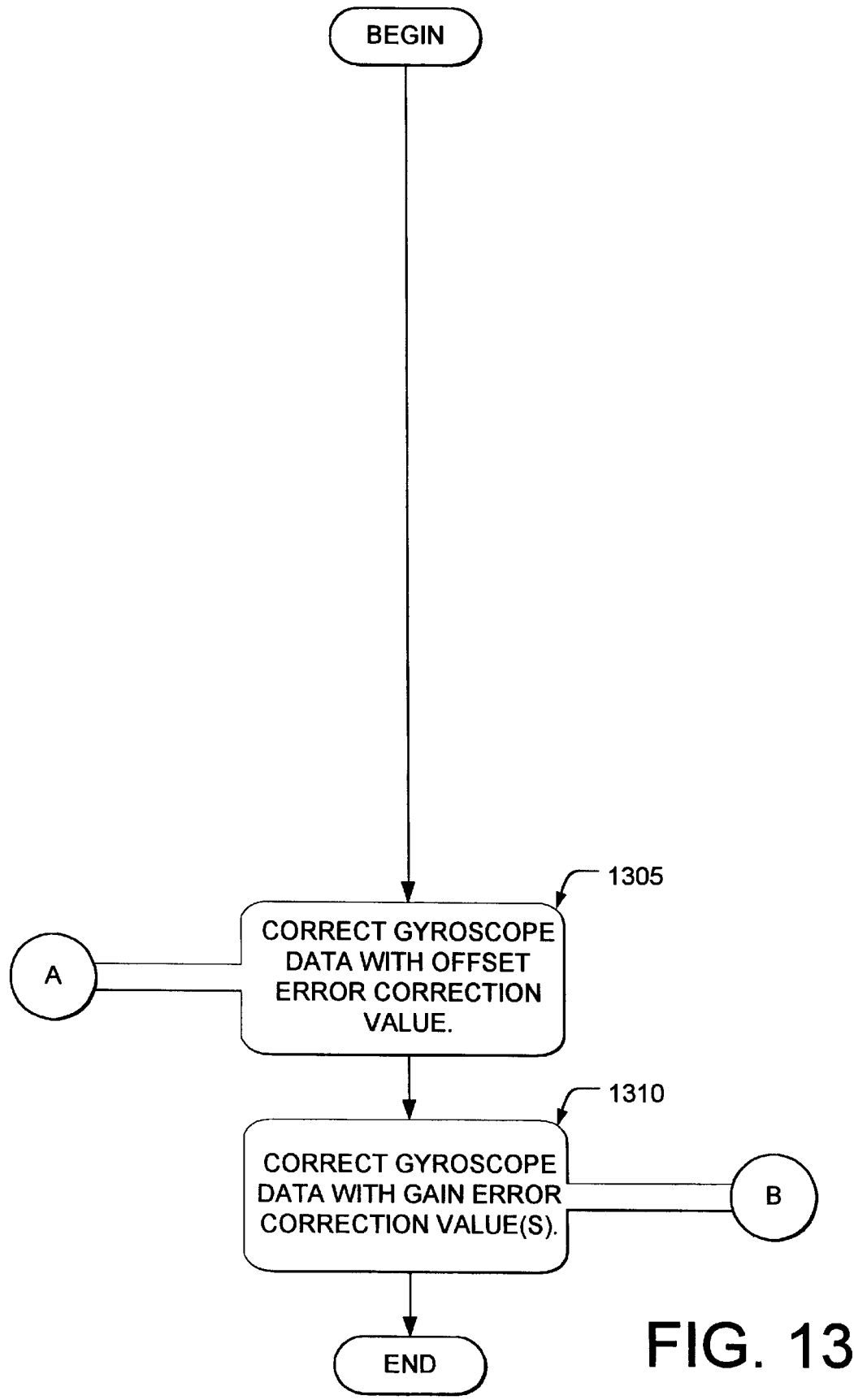
FIG. 13 illustrates the determination of the angular speed correction.

FIG. 12 illustrates a method for determining the value for correcting the characteristic offset error of a gyroscope mounted on a vehicle. As the first steps, the azimuth and straight-wise movement of the vehicle are thrice checked, steps 1205, 1210, 1215. If the vehicle was moving straight for each of the three checks, step 1220, a correction value for the offset error is computed, step 1225, and saved for later use, step 1230. Each of these steps is described more fully below.

Detection of Vehicle Azimuth

Figure 5A:
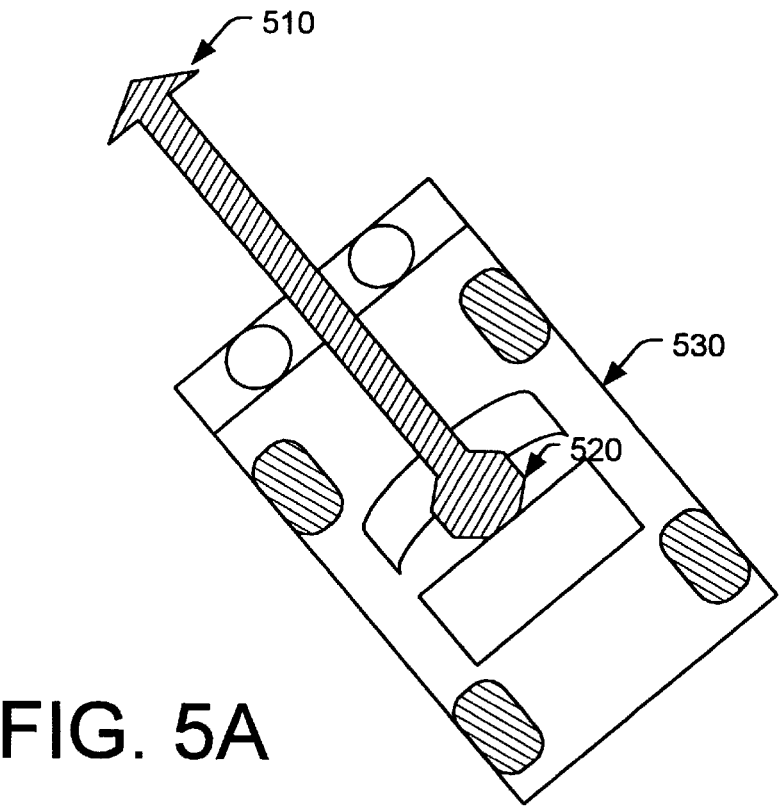
FIGS. 5A and 5B illustrate the determination of the velocity of a vehicle with respect to North and East from the data from a GPS and detecting the vehicle azimuth using these data.
Figure 5B:
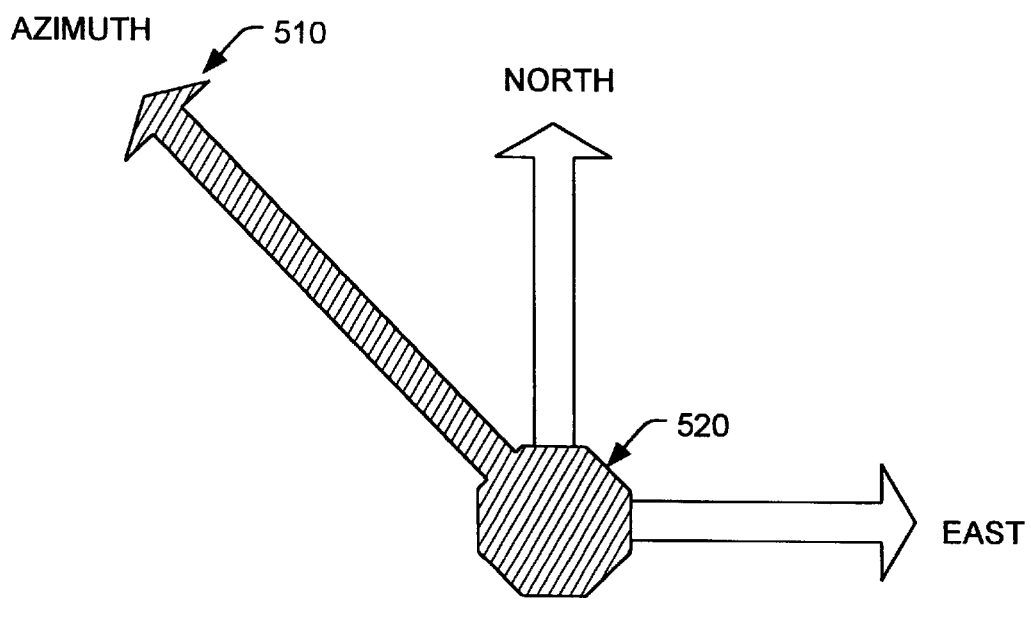

In one embodiment, a system incorporating the invention uses a Global Positioning System (GPS), or other broadcast positioning system as an azimuth detection method for a vehicle. As FIGS. 5A and 5B illustrate, the system can determine the velocity of a vehicle 530 with respect to North and East from the data from the GPS receiver and can detect the vehicle azimuth 510 using these data. The octagon 520 shows the position given by the GPS and the arrow 510 shows the azimuth. Thus, the system can check vehicle azimuths as required in steps 1205 through 1215.

However, at low speeds, the difference in successive positions of the vehicle as detected by the GPS is small. Indeed, the difference may even fall below the ability of the GPS to detect. Therefore, in the pursuit of improved accuracy, the system 100 ignores the azimuth as determined from the GPS when the vehicle is moving slower than a predetermined speed.

Detection of Vehicle Turn

Figure 6:
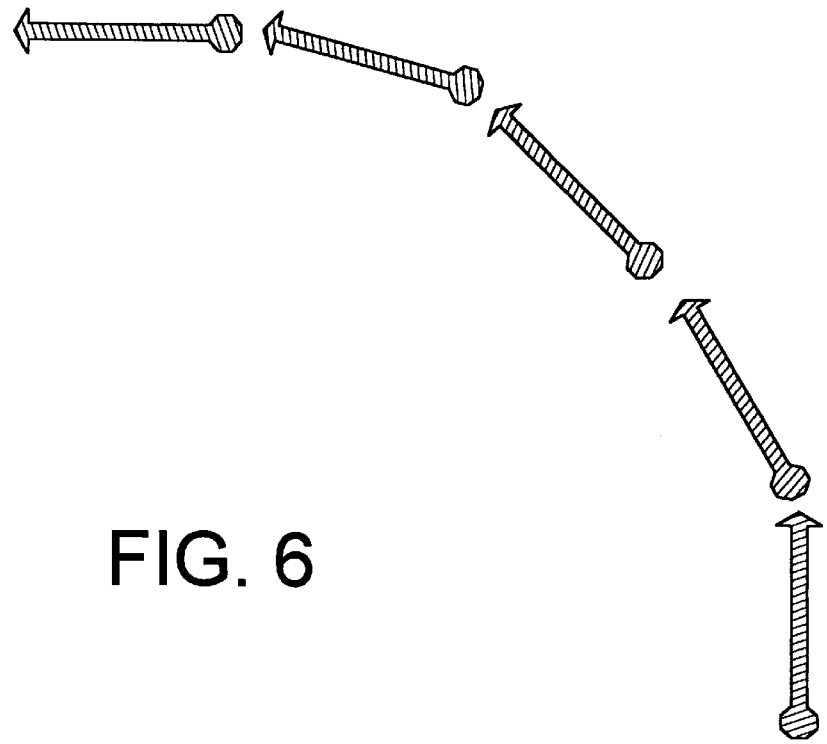
FIG. 6 shows a series of azimuths for a ninety degree turn to the left.

In another embodiment, a navigation system incorporating one aspect of the invention can detect when the vehicle 530 is turning by examining a series of azimuths and then deriving the locus of the series. FIG. 6 shows a series of azimuths for a ninety degree turn to the left.

Detection of Vehicle Straight Movement

Figure 8:
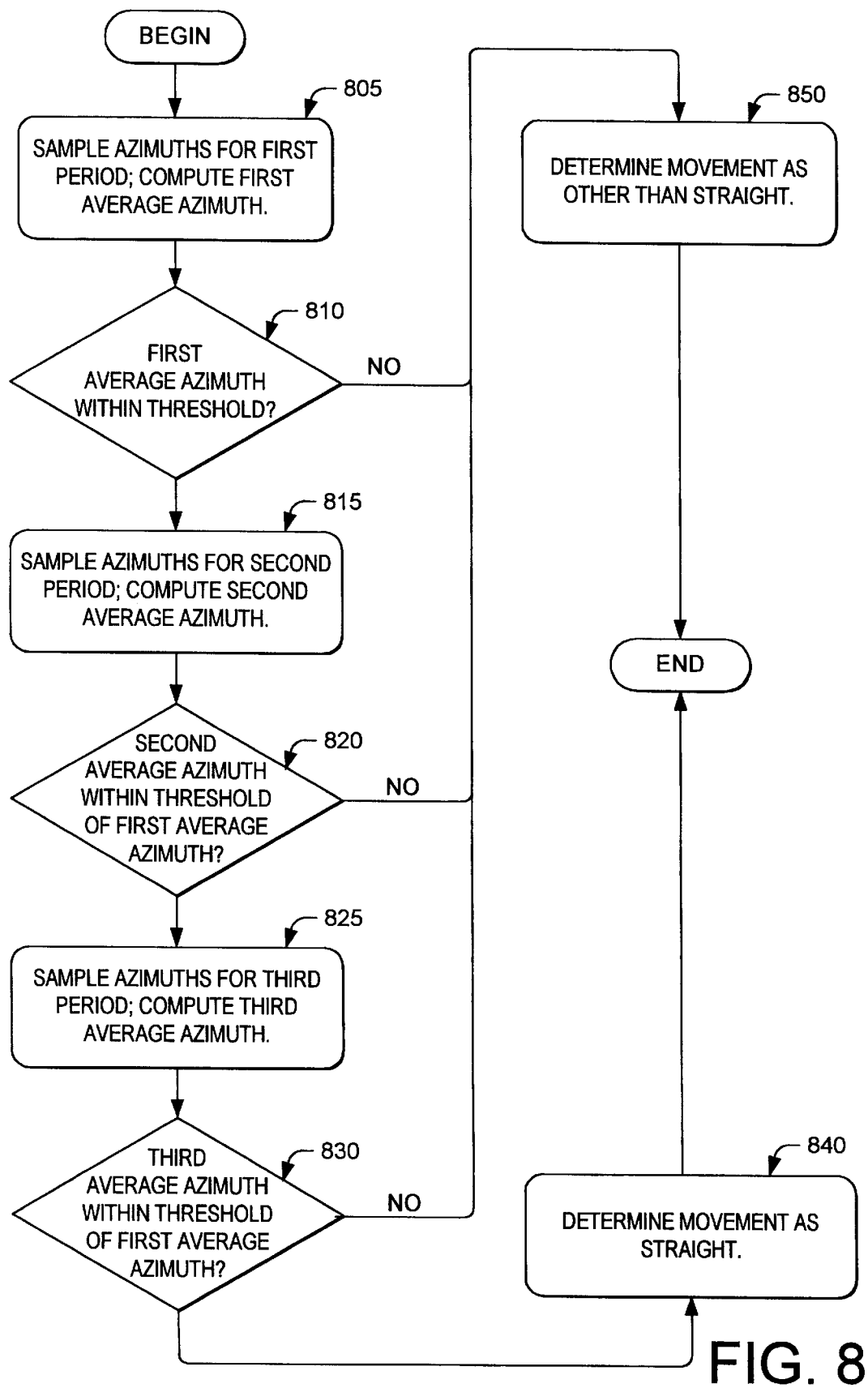
FIG. 8 illustrates a method to determine whether a vehicle is moving in a straight line.

On the other hand, a system incorporating another aspect of the invention determines whether the vehicle is moving in a straight line using a three-check method. FIG. 12 gives an overview of this method, and FIG. 8 illustrates this three-check method in more detail. The system samples azimuth values for a predetermined period of time, step 805. If all the sampled azimuths are within a predetermined threshold of their average, the system recognizes the possibility that the vehicle was moving in a straight line for the sampling time period, step 810. In the second step, the system again samples azimuth values for a second predetermined period of time, step 815. However, the system continues to recognize the possibility of straight-line movement when the average of the azimuths sampled in the second predetermined period is within a predetermined threshold of the average azimuth from the first predetermined period, step 820. Finally, as the third check, the system again samples azimuth values for a third predetermined period, step 825. The system finally concludes the vehicle was moving in a straight line over the three periods, step 840, where the average of the azimuths samples of the third predetermined period falls within a predetermined threshold of the average azimuth from the first predetermined period, step 830.

In this way, the checks for straight movement and detection of straight movement for three periods of time of FIG. 12 can be accomplished.

In a preferred embodiment, the first, second and third predetermined periods follow immediately one on the other and are of equal duration. Also, the thresholds for averages for the second and third periods are identical to the first, although some relaxing is permissible. Finally, while the method described uses three time periods, any number of time periods greater than or equal to two can be used.

Figure 7A:
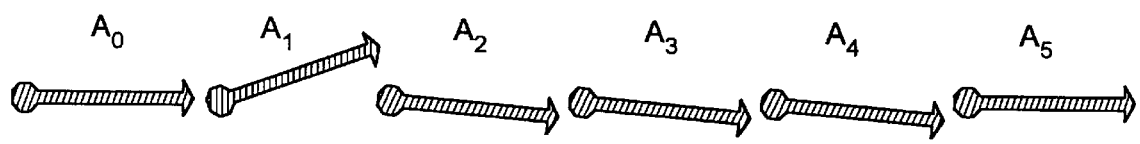
FIGS. 7A and 7B illustrate the averaging of a number of azimuths $A_n$ to produce an average azimuth.
Figure 7B:
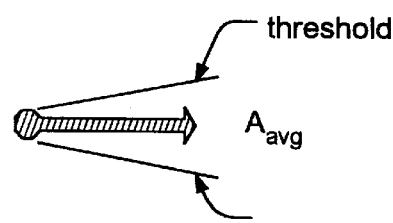

FIGS. 7A and 7B illustrate the averaging of a number of azimuths $A_n$ to produce an average azimuth $A_{avg}$ and the testing of the average azimuth against a threshold. Equation (7) presents the averaging mathematically:

$$A_{avg} = \frac{\sum_{n}^{n} A_n}{n} \qquad (7)$$

Figure 9A:
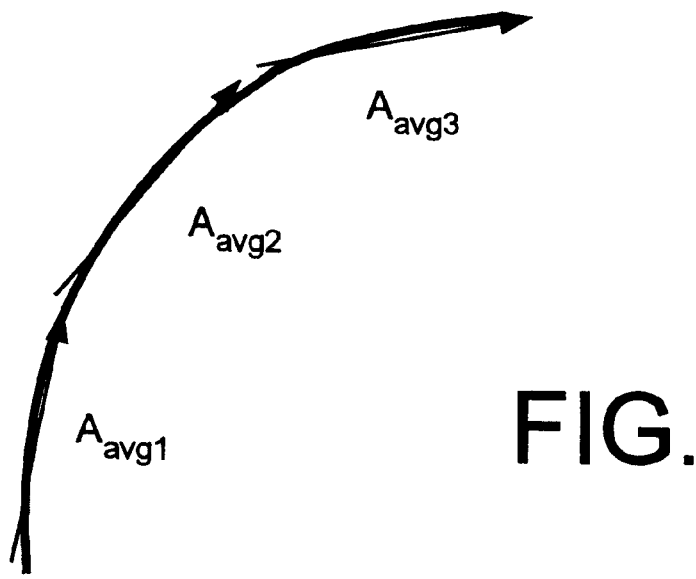
FIGS. 9A and 9B illustrate an advantage of repeatedly testing new azimuth averages against an historic threshold.
Figure 9B:
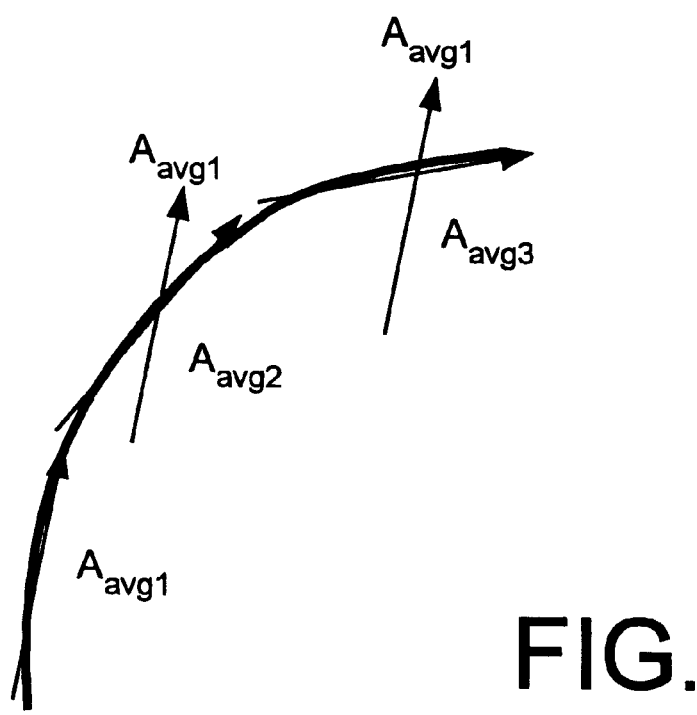

FIGS. 9A and 9B illustrate an advantage of repeatedly testing new azimuth averages against an historic average. In FIG. 9A, the average of the second sampling of azimuths, $A_{avg_2}$, used to determine whether the vehicle was still moving in a straight line during the second time period. Likewise, the average of the third sampling of azimuths, $A_{avg_3}$, is used to determine whether the vehicle was moving in a straight line during the third time period. As can be seen, even though each of the average azimuths (e.g., $A_{avg_3}$) may fall within a threshold of the immediately preceding average azimuth (e.g., $A_{avg_2}$) and thus indicate that the vehicle is moving linearly, the vehicle may in fact be turning. By contrast, for the same turn, FIG. 9B illustrates that using an historic average azimuth (e.g., $A_{avg_1}$) helps to prevent false determinations of linear movement.

Determination of Offset Correction Value

Above has been described a system and method for detecting whether a vehicle is moving in a straight line. Below is described the use of the straight-movement detection to determine an offset error correction value.

When a vehicle containing (a navigation system containing) a gyroscope moves in a straight line, the preferred output voltage of the gyroscope is $V_{OFFSET}$. If the output voltage of the gyroscope is not $V_{OFFSET}$, the voltage difference is an offset error which should be corrected. Equation (8) gives the offset error and thus the offset error correction value as indicated in step 1225:

$$V_{OFFSET\ ERROR} = V_{GYRO\ AVG_2} - V_{OFFSET} \qquad (8)$$

where $V_{GYRO\ AVG_2}$ is the average voltage obtained from the second of the three time periods (step 815) used to make the determination that the vehicle was moving straight (step 840).

Determination of Gain Correction Value

Figure 14A:
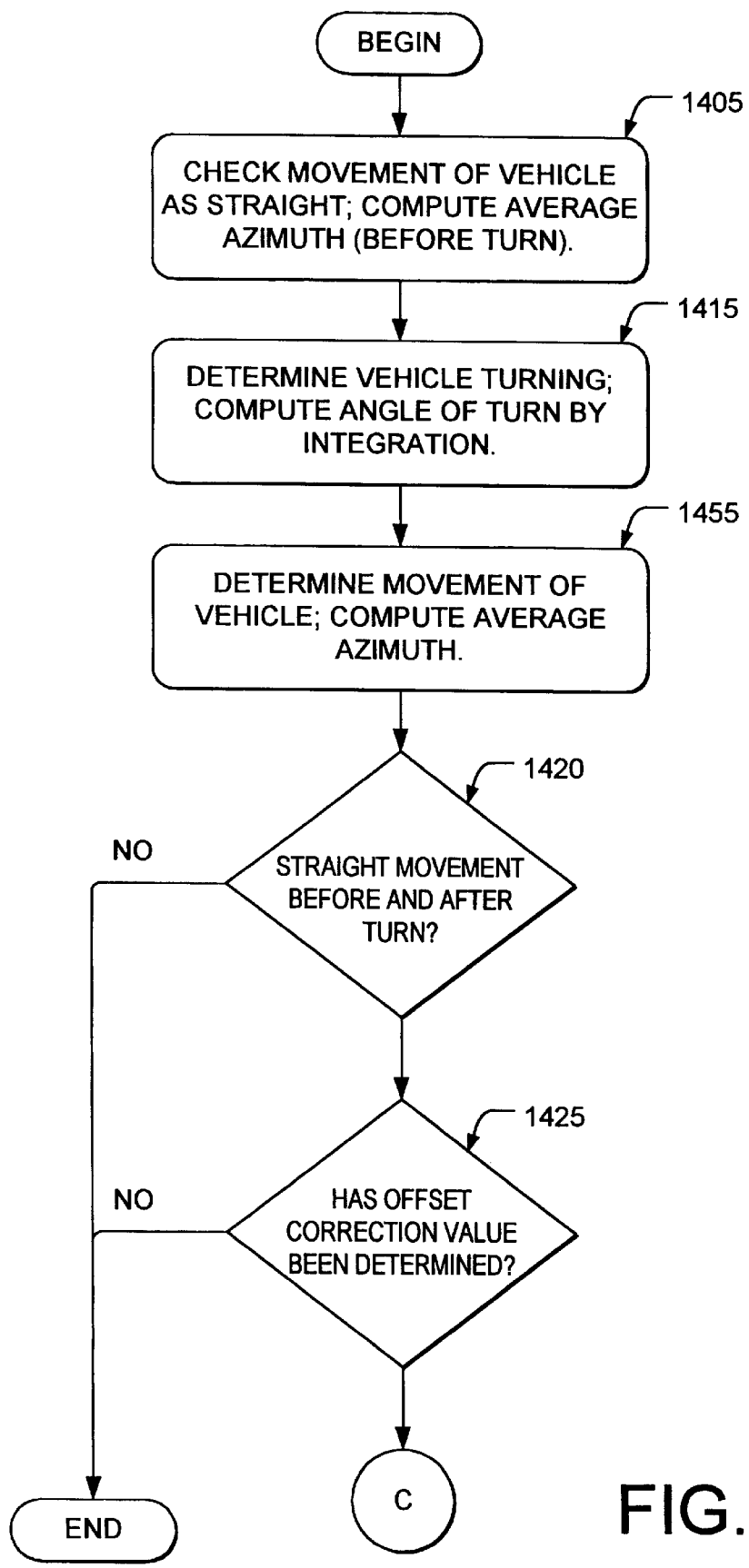
FIGS. 14A and 14B illustrate the determination of the gain error correction value.
Figure 14B:
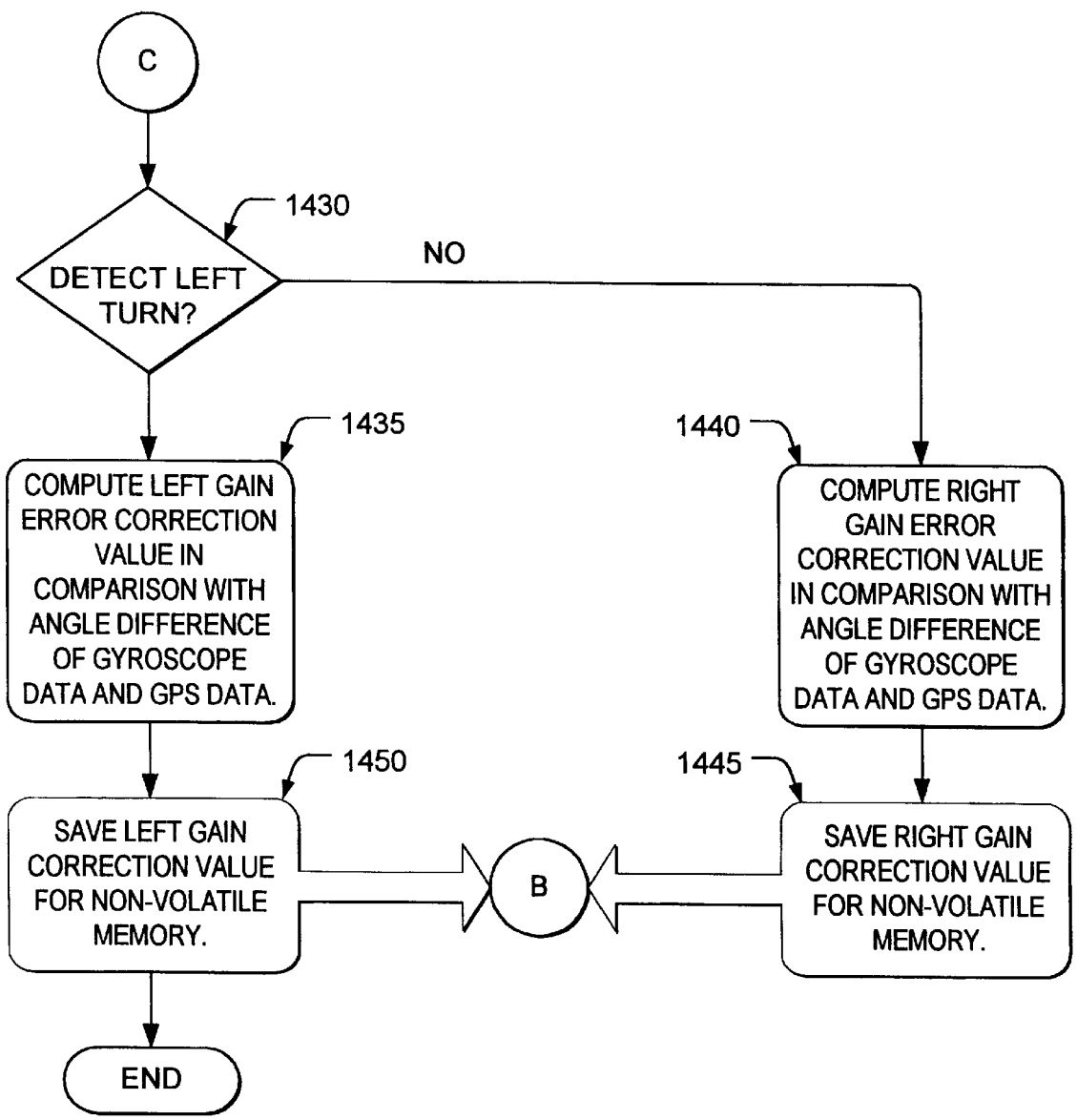

A navigation system incorporating another embodiment of the invention can determine and compensate for gain error as described herein. FIGS. 14A and 14B illustrate a method for determining a gain error correction value. When the system detects that the vehicle was first moving straight, step 1405, then turning, step 1415, then moving straight again, steps 1455, 1420, the system can determine an accurate angle for the turn from the GPS. The system uses the moving azimuths from the straight movements preceding and following the turn, steps 1405, 1455.

Figure 10B:
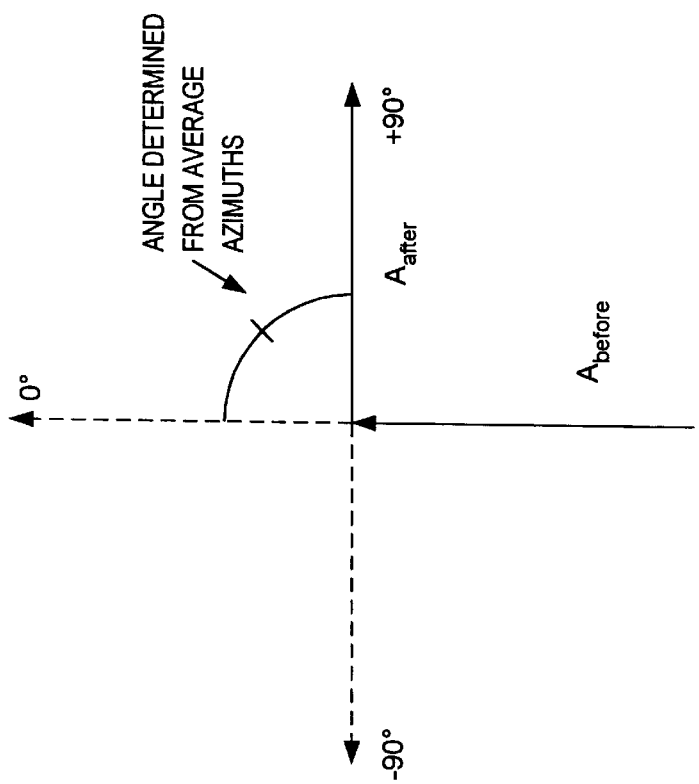
FIGS. 10A and 10B illustrate the use of average azimuths to accurately determine the angle of a turn.
Figure 10A:
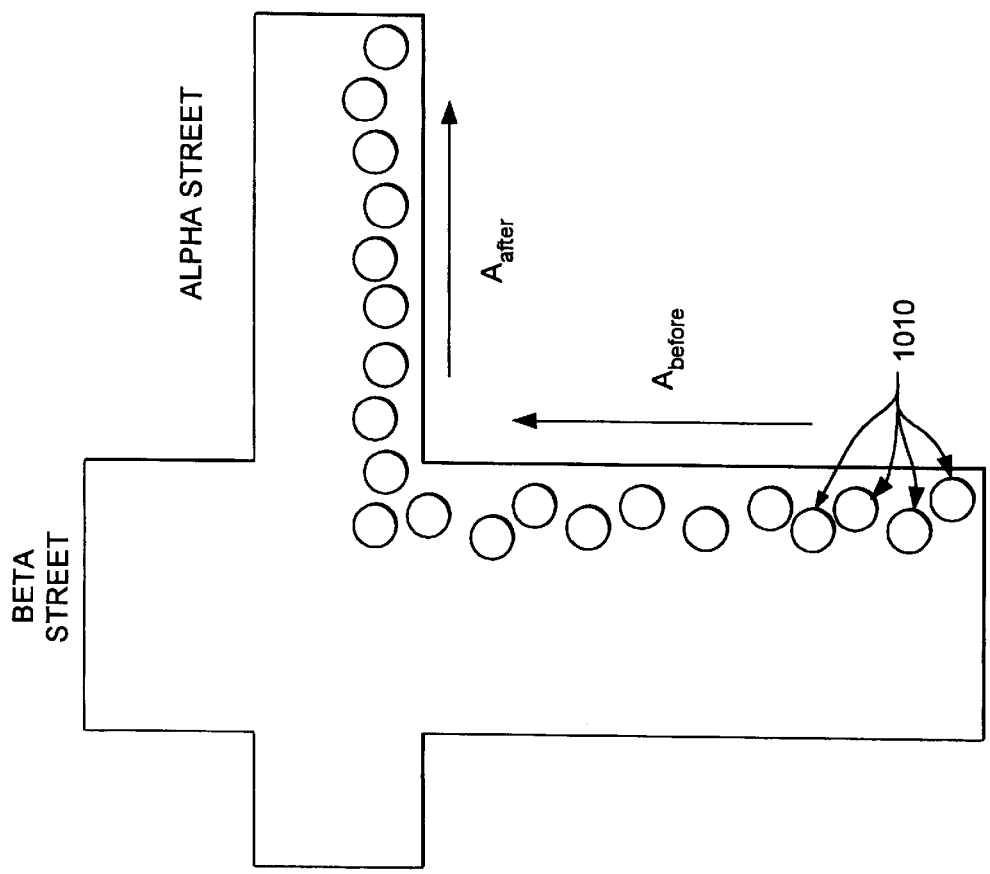

FIGS. 10A and 10B illustrate the use of average azimuths to accurately determine the angle of a turn. The positional octagons 1010 represent the actual azimuths of the moving vehicle. Before the turn from Beta Street onto Alpha Street represented in FIG. 10A, the vehicle is moving along Beta Street with an average azimuth $A_{before}$. (See FIGS. 10A and 10B.) Similarly, the average azimuth $A_{after}$ (FIGS. 10A and 10B) represents the movement of the vehicle after completing the turn. By projecting the average azimuth $A_{before}$ to indicate zero degrees with respect to any subsequent turn, FIG. 10B, the navigation system can determine that the average azimuth $A_{after}$ represents a +90° turn with respect to the average azimuth $A_{before}$.

During the turn, the navigation system collects angular speeds from the gyroscope in the vehicle, steps 1415. These angular speeds have been corrected for the offset error as described herein. During turning, the navigation system computes the angle of turn (θ) by integrating these offset error-corrected angular speeds, step 1415. (The system does not compute the gain error correction value before determining the offset correction value in order to avoid incorrectly determining the gain error correction value with offset error. Cf. step 1425.)

The gain error correction value $K_{GAIN\ ERROR}$ is determined as follows:

$$K_{GAIN\ ERROR} = \frac{\theta}{A_{after} - A_{before}} \quad (9)$$

where θ is the angle of turn computed by integration of the offset error-corrected angular speed, obtained from the gyroscope; $A_{after}$ is the average azimuth after turning, obtained from the GPS; and $A_{before}$ is the average azimuth before turning, also obtained from the GPS. Cf. steps 1435, 1440.

The denominator of equation (9) can range from large to relatively small. Accordingly, when the difference between the before and after average azimuths is relatively small, $K_{GAIN\ ERROR}$ includes a relatively larger error (as compared with larger turns). To avoid this problem, the navigation system does not compute $K_{GAIN\ ERROR}$ when the turn angle is smaller than a predetermined angle.

Alternatively, the navigation system determines $K_{GAIN\ ERROR}$ as an average over a predetermined number of turns.

For a gyroscope whose gain does not change suddenly, the gain error correction value ($K_{GAIN\ ERROR}$) can be computed in another alternative as described herein. Where $K_1$ and $K_2$ are predetermined thresholds and where $$\frac{\theta}{A_{after} - A_{before}} > K_{GAIN\ ERROR} + K_1 \quad (10)$$

then $K_{GAIN\ ERROR}$ is increased by a predetermined amount. Similarly, where $$\frac{\theta}{A_{after} - A_{before}} < K_{GAIN\ ERROR} + K_2 \quad (11)$$

then $K_{GAIN\ ERROR}$ is decreased by a predetermined amount. If the relationship among θ, $A_{after}$, $A_{before}$ and $K_{GAIN\ ERROR}$ is otherwise, then $K_{GAIN\ ERROR}$ is not changed. $K_{GAIN\ ERROR}$ is initially set to zero.

Classification of Gain for Right Turns and Left Turns

The gain error correction value is determined independently for right and left turns, steps 1430 through 1440.

Correction of Angular Speed

A navigation system incorporating yet another embodiment of the invention correct the angular speed gyroscopic output voltage for the offset error and gain error as described herein. The angular speed is corrected according to the formula in Equation (12):

$$AS_{CORRECTED} = \frac{V_{GYRO\ OUT} - (V_{OFFSET} + V_{OFFSET\ ERROR})}{G/K_{GAIN\ ERROR}} \quad (12)$$

In the case of right turns:

$$K_{GAIN\ ERROR} = K_{RIGHT\ GAIN\ ERROR} \quad (13)$$

where $K_{RIGHT\ GAIN\ ERROR}$ is the gain error correction value for right turns. Similarly, for left turns:

$$K_{GAIN\ ERROR} = K_{LEFT\ GAIN\ ERROR} \quad (14)$$

where $K_{LEFT\ GAIN\ ERROR}$ is the gain error correction value for left turns.

Figure 11:
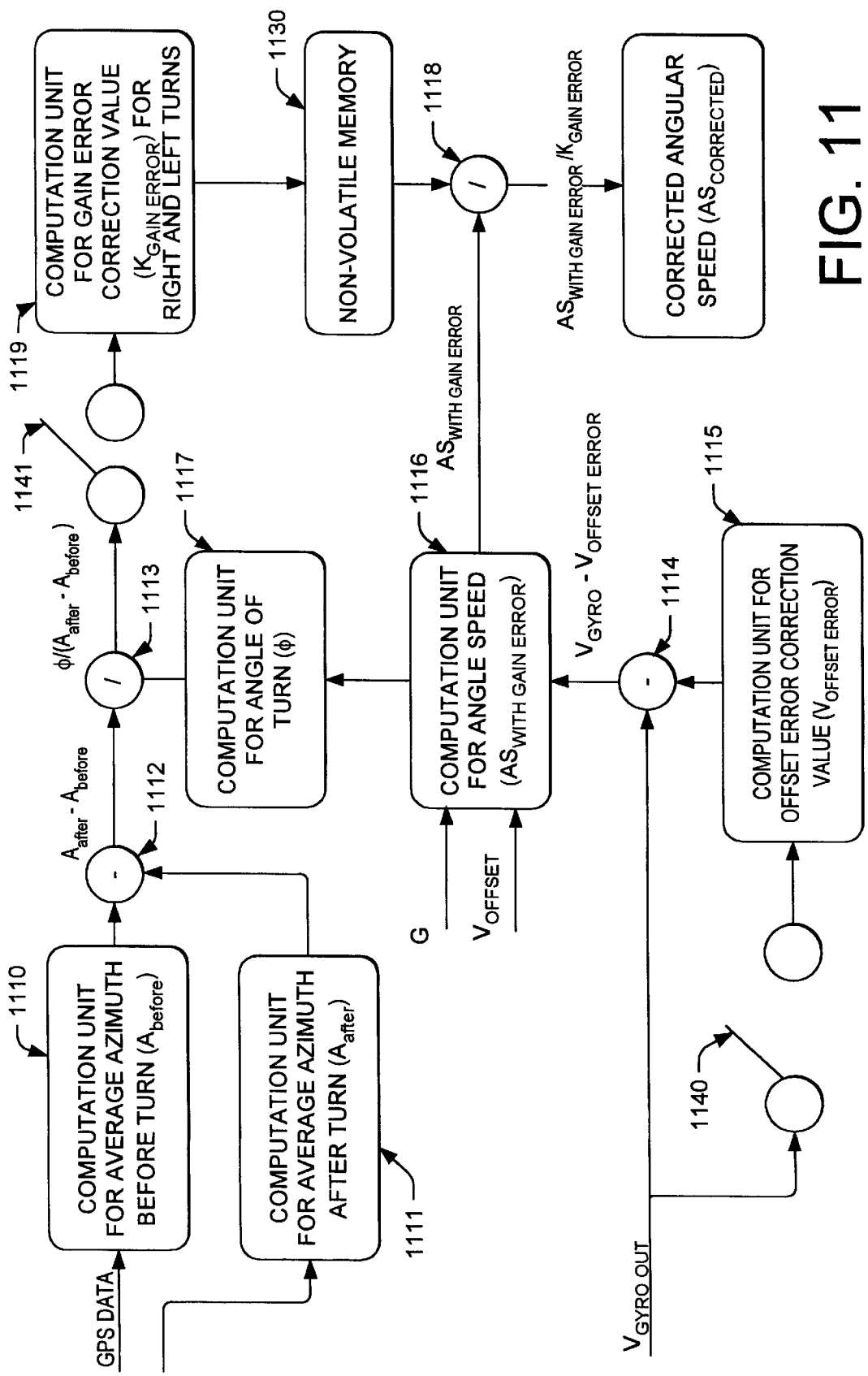
FIG. 11 shows the flow of data to determine the corrected angular speed $AS_{CORRECTED}$.

FIG. 11 shows the flow of data to determine the corrected angular speed $AS_{CORRECTED}$. In FIG. 11, the computation units 1110, 1111 compute the average azimuths before ($A_{before}$) and after ($A_{after}$) a turn, respectively, using GPS or similar data. These values are the inputs for the computation unit 1112. The output of the computation unit 1112 is a denominator input for the computation unit 1113.

The output voltage of the gyroscope ($V_{GYRO}$) is an input to the computation unit 1115 which computes the offset correction value ($V_{OFFSET\ ERROR}$) when the system detects straight movement (i.e., when the switch 1140 is closed). The computation unit 1114 computes the corrected output voltage of the gyroscope ($V_{GYRO}-V_{OFFSET\ ERROR}$) with the output voltage of the gyroscope ($V_{GYRO}$) and the output of the computation unit 1115 as inputs.

The corrected output voltage of the gyroscope is an input to the computation unit 1116 which computes the angular speed ($AS_{WITH\ GAIN\ ERROR}$). The output of the computation unit 1116 is an input to both computation units 1117 and 1118.

The computation unit 1117 computes the angle θ of a turn for input as the numerator input to the computation unit 1113.

The output of the computation unit 1113 is an input for the computation unit 1119 which computes the gain error correction values ($K_{GAIN\ ERROR}$) for right and left turns. The switch 1141 is closed when straight movement is detected before and after a turn.

Finally, the output of the computation unit 1119 and the computation unit 1116 are input to the computation unit 1118 for division. The output of the computation unit 1118 is the desired corrected angular speed ($AS_{CORRECTED}$), the angular speed with gain error ratioed by the gain error correction value.

Correction Immediately after Power On

The gain error correction value ($K_{GAIN\ ERROR}$) is stored in memory (1130) so the angular speed ($AS_{CORRECTED}$) can be corrected on the powering up of the navigation system.

The invention as described herein is useful not only for gyroscopes but for all angular speed detection sensors. Further, this invention is useful not only for the global positioning system but for all azimuth detection sensors. Finally, this invention is useful not only for vehicles but for any moveable body.

In contrast to Odagawa, U.S. Pat. No. 5,404,307, the invention described herein is capable of correcting differentially for right and left turn gain errors.

In contrast to Masumoto, U.S. Pat. No. 5,424,953, the present invention can detect a vehicle's movement in a straight line using only GPS (or similar) data, even where the angular speed sensor has an offset error.

Finally, the invention makes correction of data from the gyroscope possible immediately on powering up of the system by saving a correction value before the preceding powering off of the system.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

What is claimed is:

1. A method for determining a position of an object, comprising:

correcting a gain error associated with an angular speed detector using an azimuth detector distinct from the angular speed detector, the azimuth detector determining an azimuth based on movement of the object, wherein correcting the gain error comprises determining said gain error as an average of gain errors over a predetermined number of turns; and after correcting the gain error, determining the position of the object using the angular speed detector.

2. A method for determining a position of an object, comprising:

correcting a gain error associated with an angular speed detector using an azimuth detector distinct from the angular speed detector the azimuth detector determining an azimuth based on movement of the object, wherein correcting the gain error comprises determining said gain error as the ratio of an angle of a turn as determined by said angular speed detector and the angle of said turn as determined by the difference between average azimuths before and after said turn as determined by said azimuth detector; and after correcting the gain error, determining the position of the object using the angular speed detector.

3. A method for determining a position of an object, comprising:

correcting a gain error associated with an angular speed detector using an azimuth detector distinct from the angular speed detector, the azimuth detector determining an azimuth based on movement of the object, wherein correcting the gain error comprises:
determining the movement of said object as straight;
then determining the movement of said object as a turn;
then determining the movement of said object as straight again; and
computing a left gain error correction value if said turn was a left turn; and
computing a right gain error correction value if said turn was a right turn; and after correcting the gain error, determining the position of the object using the angular speed detector.

4. A method for determining a position of an object, comprising:

correcting an offset error associated with an angular speed detector using an azimuth detector distinct from the angular speed detector, the azimuth detector determining an azimuth based on movement of the object wherein correcting the offset error comprises,
checking an azimuth of the object and movement of the object for first and second periods of time;
checking whether the object was moving in a straight line in each of the first and second periods of time by referring to an average azimuth corresponding to the first period of time; and
computing an offset error correction value using data from the second period in response to a determination that the object was moving in substantially a same direction in each of the first and second periods of time, wherein the offset error correction is not computed based upon a difference between data obtained from the first and second time periods; and after correcting the offset error, determining the position of the object using the angular speed detector.

5. The method of claim 1 wherein said step of correcting an offset error of an angular speed detector comprises:
correcting an offset error of a gyroscope.

6. The method of claim 1 wherein checking the azimuth of the object and checking whether the object was moving in a straight line are done during a third period of time.

7. A method for determining a position of an object, comprising:

correcting a gain error associated with an angular speed detector using an azimuth detector distinct from the angular speed detector the azimuth detector determining an azimuth based on movement of the object;
correcting an offset error associated with the angular speed detector using the azimuth detector, wherein correcting the offset error comprises:
checking an azimuth of the object and movement of the object for first and second periods of time;
checking whether the object was moving in a straight line in each of the first and second periods of time by referring to an average azimuth corresponding to the first period of time; and
computing an offset error correction value using data from the second period where the object was moving in a straight line in each of the first and second periods of time; and after correcting the gain error and the offset error, determining the position of the object using the angular speed detector.

8. A method for determining a position of an object, comprising:

correcting a gain error associated with an angular speed detector using an azimuth detector distinct from the angular speed detector, the azimuth detector determining an azimuth based on movement of the object, wherein correcting the gain error comprises:
determining the movement of said object as straight;
then determining the movement of said object as a turn;
then determining the movement of said object as straight again; and
computing a left gain error correction value if said turn was a left turn; and computing a right gain error correction value if said turn was a right turn;

correcting an offset error associated with the angular speed detector using the azimuth detector; and after correcting the gain error and the offset error determining the position of the object using the angular speed detector.

9. A method for correcting an offset error associated with an angular speed detector attached to an object, the method comprising:
checking an azimuth of the object and movement of the object for first and second periods of time;
checking whether the object was moving in a straight line in each of the first and second periods of time by referring to an average azimuth corresponding to the first period of time; and
computing an offset error correction value without reference to data from the first period in response to a determination that the object was moving in substantially a same direction in each of the first and second periods of time.

10. The method of claim 9 wherein checking the azimuth of the object and checking whether the object was moving in a straight line are done during a third period of time.

11. A method for detecting gain error in an angular speed detector attached to an object, said method comprising:

determining the movement of said object as straight;

then determining the movement of said object as a turn;

then determining the movement of said object as straight again; and computing a left gain error correction value if said turn was a left turn; and computing a right gain error correction value if said turn was a right turn.

12. A method for detecting gain error in an angular speed detector attached to an object, said method comprising:

subjecting said object to a turn;

determining an angular speed detected angle of said turn using said angular speed detector;

determining a differential of average azimuths angle of said turn as the difference between average azimuths before and after said turn; and determining said gain error using the ratio of said angular speed detected angle and the differential average azimuth angle.

13. The method of claim 12 wherein said step of determining said gain error comprises:

determining said gain error as the ratio of said angular speed detected angle and the differential of average azimuths angle.

14. The method of claim 12 wherein said step of determining said gain error comprises:

initially setting said gain error to a first predetermined value, thereby setting a current value of said gain error;

increasing said gain error by a second predetermined value if said ratio is greater than the sum of the current value of said gain error and a first predetermined threshold, thereby resetting the current value of said gain error; and decreasing said gain error by a third predetermined value if said ratio is less than the sum of the current value of said gain error and a second predetermined threshold, thereby resetting the current value of said gain error.

15. The method of claim 14 wherein said step of determining said gain error further comprises:

leaving said gain error unchanged if said ratio is neither more nor less than the sum of the current value of said gain error and a second predetermined threshold, thereby leaving the current value of said gain error unchanged.

16. A method for detecting straight-line movement of an object, said method comprising:

sampling azimuths for said object for a first predetermined time period; and computing a first average azimuth;

checking whether said first average azimuth is within a first predetermined threshold;

determining the movement, if any, of said object during said first predetermined time period as not straight-line if said first average azimuth is not within said first predetermined threshold;

sampling azimuths for said object for a next predetermined time period; and computing a next average azimuth;

checking whether said next average azimuth is within a next predetermined threshold; and determining the movement, if any, of said object during said predetermined time periods as not straight-line if said next average azimuth is not within said next predetermined threshold; otherwise, determining the movement of said object during said predetermined time periods as straight-line.

17. The method of claim 16 wherein said first and next predetermined thresholds are the same.

18. The method of claim 16 wherein said first and next predetermined time periods follow immediately one on the other.

19. The method of claim 16 wherein said first and next predetermined thresholds are of equal duration.

20. The method of claim 16 wherein before said step of sampling for a next predetermined time period is performed, the following steps are performed:

sampling azimuths for said object for a second predetermined time period; and computing a second average azimuth;

checking whether said second average azimuth is within a second predetermined threshold; and determining the movement, if any, of said object during said second predetermined time period as not straight-line if said second average azimuth is not within said second predetermined threshold.

21. A method for correcting for gain error in an angular speed detector attached to an object, the angular speed detector being associated with a system for determining a position of the object, said method comprising:

determining said gain error;

then saving said determined gain error in a nonvolatile memory;

then powering off said system; and then powering on said system; and using said saved determined gain error to correct the output of said angular speed detector.

* * * * *